Figure 5:
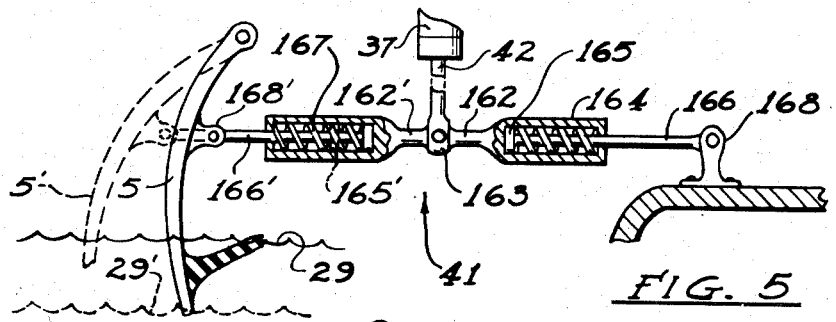

July 14, 1953
O. BROWN
2,645,436
HYDROAERIAL LANDING AND LAUNCHING
MEANS, INCLUDING MODUS OPERANDI
Filed April 27, 1948
2 Sheets-Sheet 1
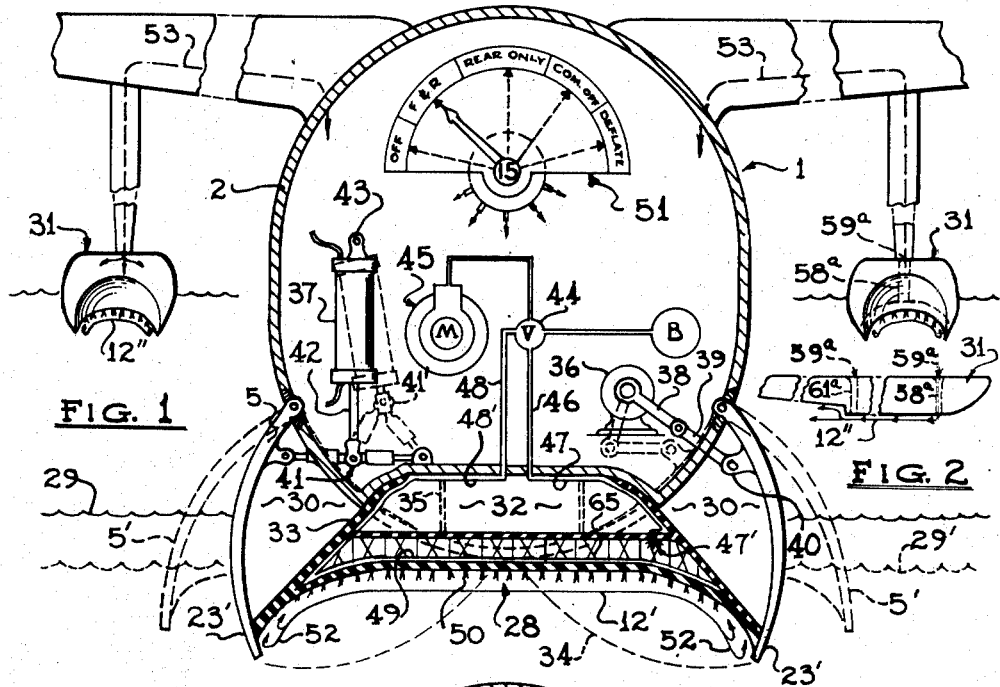
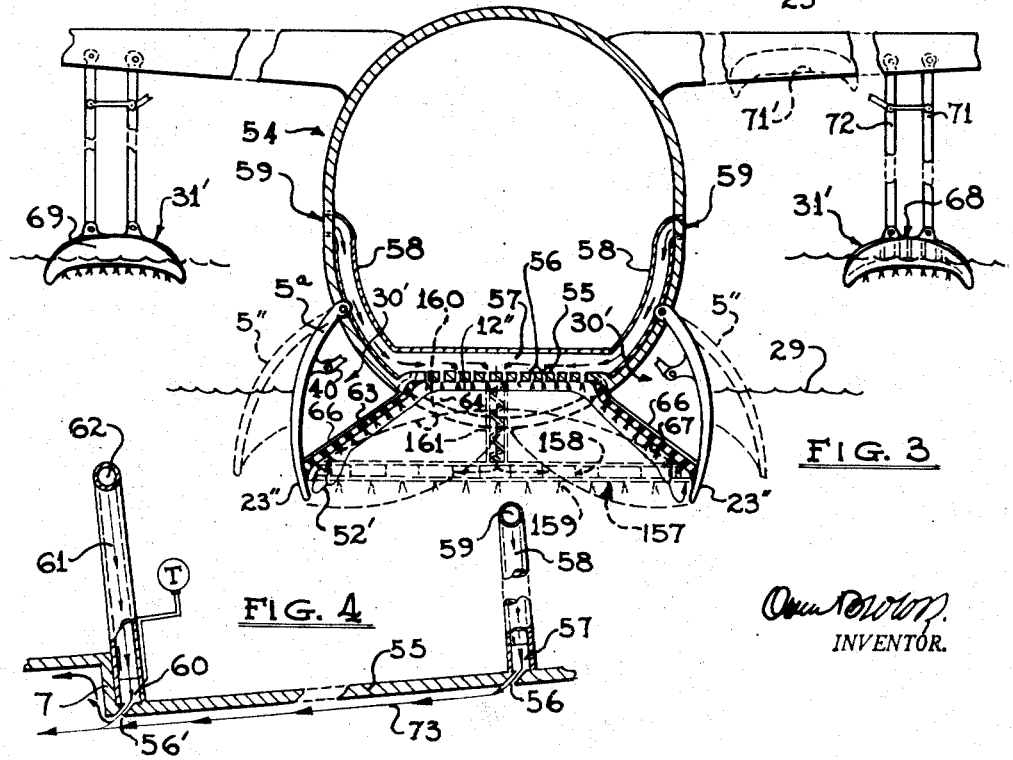
INVENTOR.

*INVENTOR.*

Patented July 14, 1953

2,645,436

UNITED STATES PATENT OFFICE 2,645,436

HYDROAERIAL LANDING AND LAUNCHING MEANS, INCLUDING MODUS OPERANDI

Owen Brown, Los Angeles, Calif.

Application April 27, 1948, Serial No. 23,644

21 Claims. (Cl. 244—102)

My invention relates to the launching of aircraft from water. More particularly, however, it relates to the landing of aircraft on water, whereby one great disadvantage inherent in existing hydroaerial craft—by comparison with most land-based planes and gliders—may be substantially minimized.

Thus I provide means whereby amphibious types may have fully streamlined fuselages in structure with an entirely new kind of hydrodynamic undercarriage, such as hereinafter described.

It is well known that whereas water is a fluid and can readily be displaced at a given surface area by an object dropped thereon having a higher specific gravity, the same surface, when struck sharply by such a body, will not yield instantaneously, but, on the contrary, will exhibit certain characteristics associated with solids. For this reason the pilots of flying boats and the like must be careful to execute particularly flat touch-downs, following a long low glide.

The difficulty resides, primarily, in the fact that while land-based aircraft are equipped with balloon tires, which serve to substantially lessen the effect of landing stresses occurring at the instant of impact, as well as with so-called oleo-struts which further compensate for landing shocks, water based flying boats, amphibians and the like are not provided with aquatic alighting gear having a fully comparable function.

Therefore, inasmuch as hull bottoms are usually of solid, unyielding construction, each touchdown is, of necessity, in the nature of a belly landing, calling for particularly expert handling of the aircraft. Landings by seaplanes are not fundamentally different, moreover, since also lacking the full equivalent of both pneumatic tires and said oleo struts.

So far as is known to this applicant, the first fully constituted marine "undercarriage" of its broad class is introduced herein; and by means of which most sharp, hull-to-water impacts may be largely absorbed and dissipated; thus making possible "hotter" landings—at much greater landing speeds, that is—as well as landings from a sharper angle of descent to the water.

This last should be of great advantage in the landing of commercial flying boats and amphibians within the confines of relatively small harbors and basins, while, in the case of lesser hydroaeroplanes, it now becomes possible for such light craft to drop into comparatively small, heretofore inaccessible lakes—often rimmed about by tall forest trees or rocky mountain crags—at a relatively sharp angle of glide instead of by the usually prolonged prior leveling-off procedure.

It is a primary object of the invention, therefore, to provide landing means for hydroaeroplanes which is substantially the equivalent of oleo-struts and the like on present land-based aerodynes.

It logically follows that another important object is to make possible the production of aircraft having the clean streamlining and superior flight characteristics of conventional, land-based airplanes, yet which are as much in their element when landing on or launching from water as are those primarily or solely designed for hydroaerial service.

Other objects will be made apparent hereinafter. And while a plurality of specific embodiments is disclosed, it will be understood that no limitation is intended to be expressed except as may, by predetermination, be set forth in the appended claims.

In the drawings:

Fig. 1, a diagrammatic front elevation, indicates one possible embodiment of my invention.

Fig. 2 is a side elevational view of a float which could be used on the Fig. 1 aircraft.

Fig. 3, also in front elevation, illustrates a simplified version of the undercarriage featured on said aircraft of Fig. 1.

Fig. 4, a fragmental side elevation, relates particularly to the aircraft of Fig. 3 rising to the take-off position.

Fig. 5, a fragmental front elevation, shows a detail of the toggle mechanism of Fig. 1.

Figure 6:
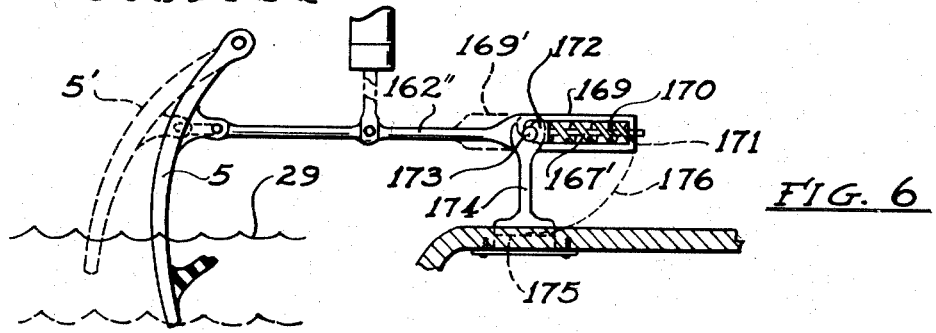

Fig. 6, another fragmental view, illustrates one of sundry possible mechanical equivalents of the Fig. 5 assembly.

Figure 7:
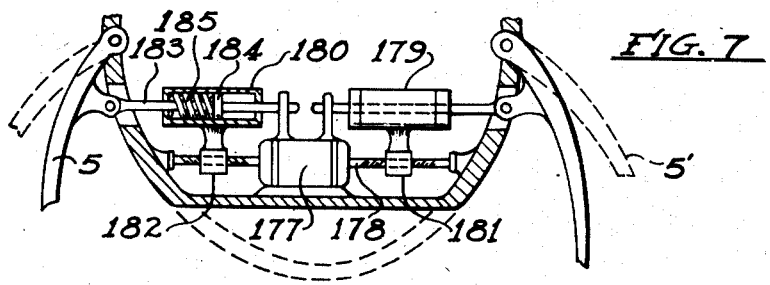
Figure 8:
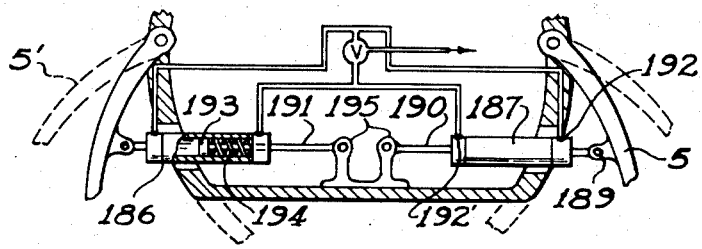

Fig. 7, also fragmental, shows another structure comparable to those of Figs. 5 and 6; and Fig. 8 illustrates a still further, somewhat simplified, form of the apparatus of Figs. 5 to 7 inclusive.

Like characters and numerals indicate like elements in the several figures of the drawing.

General features of the undercarriage

As previously intimated, the present invention relates to both the launching and the landing of hydroaerial craft, since my improved undercarriage is normally and inherently employed in both relationships. Therefore, while concerned primarily with landing means and techniques, in order to clearly comprehend these it is necessary to explain, in some detail, those features of said undercarriage which come into play at the time of a launching operation.

It is known—as exemplified by structures of the prior art—that the adhesion which occurs between hull bottoms and the water component exerts a powerful retarding effect when it is desirable to bring about a separation therebetween; and sundry means have been proposed to minimize this difficulty. One such means includes the creation of a layer of boundary air along the underside of the hull, and, as herein described, this may be provided in the form of either pressurized air jets or by the coincidental aspiration and expulsion of atmospheric air by the suction principle.

Conveniently, therefore, both of these systems are incorporated in respective embodiments of said undercarriage; but since my present disclosure, including the claims hereinafter, is not primarily directed thereto, and since skilled individuals will readily understand the hydrodynamic principles involved from the data given, the latter will be restricted largely to the actual structures of my dual-purpose apparatus; more particularly, such as will now be described with regard to Figs. 1 to 4 inclusive.

Referring first to Fig. 1, the amphibian there shown may be either a self-propelled aircraft or a towable glider. In this modification, the hull 28 is of tunnel configuration, having a duality of so-called right and left twin keels 23' and 23'. If keels 23' and 23' do not conform to naval architectural nomenclature, said hull may be regarded as having no keel at all; a feature which is relatively immaterial, since said keels will afford every required steerability, and the greatly increased width of beam thus obtained contributes both stabilization and buoyancy.

These latter features are of particular importance in an hydroaeroplane, inasmuch as conventional flying boat hulls are only widened beamwise at the sacrifice of streamlining, with increased drag and fuel consumption, together with lessened speeds and ranges, in order to insure stability and prevent them from floating too deeply under heavy fuel and pay-loads; which latter, to be sure, further complicates the normally difficult matter of take-off.

Thus amphibian 1, according to Fig. 1, requires no conventional sponsons; and while the tip ends (edges) of keels 23' are substantially lower than the upper water line 29, it will be noted that the hull bottom proper is theoretically, and doubtless also in practice, adapted to be submerged under light loadings no lower than the lower water-line 29'; in short, the line of contact with the main bottom of hull 28. From this position, the comparatively shallow-drafted amphibian 1 is adapted to rise to a stepwise launching attitude with the greatest facility, as augmented by the aforesaid lower boundary layer at the predetermined time. It is, therefore, of no great consequence if the aircraft rides substantially lower when under heavy cargo burdens, since it will quickly rise to the take-off position in any event.

It is also obvious that by water-sealing the connections between hull 28 and right and left semi-cantilevers 5—both fore and aft as well as laterally, whereby to create large longitudinal and otherwise unoccupied air-chambers 30—30 as well as in the central area 32—buoyancy is further enhanced.

While floats 31 are here indicated for use on the wings of the amphibian 1, it is evident that the same, in sufficiently larger sizes, could be carried directly from the fuselage, as on seaplanes. In the small view of Fig. 2, the float 31 clearly visualizes preferred locations for risers 58ª—61ª as more fully detailed in the embodiment of Fig. 3, to be explained shortly, as well as ports 59ª—59ª according to the modification there shown. The flow-line 12'' is comparable to the like schematic indication in other figures.

The right and left phantoms 5'—5' indicate one method by which the beam may be increased still further. Adequate propeller clearance may be had, on especially light craft, by the simple expedient of mounting the motor or motors on an upper tow-strut or struts, as featured on hydroaerodynes such as the Goodyear GA-2 and/or by the use of short contra-rotating props and/or props having square-tipped blades. No such modifications would be required wherein jet motors may later be adapted to light aircraft.

*Simplified retracting gear*

The auxiliary hull structure 28 is adapted to fold back within an exceedingly small area 32 of the fuselage 2 when cantilevers 5 are in closed positions. Since the webbing 33 may be of an exceptionally elastic character and adapted to be extended at considerable tension in the position shown, and since the lower ends—edges—of the cantilevers will follow the arcuate lines 34 in retracting, it is evident that hull 28, upon deflation, requires no other auxiliary retracting means and will be folded back compactly within compartment 32 by the action of the cantilevers, assisted by its own quick elastic memory. If at all necessary, however, live rubber webs 35 may be additionally supplied to facilitate retraction.

The semi-cantilevers may be extended and retracted in any preferred manner, as, for typical examples, by operating the servomotor or motors 36, with auxiliaries, or with the aid of a desirable plurality of hydraulic or pneumatic jacks 37. That is, with reference to motor 36, it is obvious that the same (in desired numbers) may operate the crank-arm 38, in cooperation with lever 39 linked to knuckle 40, for inward and outward movement of member 5 at right, while the like member at left, by option, is similarly linked to the toggle 41 whereby, upon extension of piston rod 42 to the position shown, the cantilever in question is extended and securely locked. But upon subsequent retraction of rod 42, the toggle will be broken and will fold back to the position of phantom 41'. The cylinder or jack 37 is of course carried from a fixed pivot point 43. Toggle 41 will be further explained later in relation to Figs. 5 and 6.

Two different schematic arrangements are indicated in Fig. 1, namely, the simplified diagram including valve 44, connected in to the motor, compressor and pressure tank assembly 45 and/or pressure bottle or bottles B, whereby, in one relation, hull 28 may be initially inflated through pressure line 46, including the lower conduit 47 terminating in the nozzle or nozzles 47'; and whereby, incidental to a launching operation, additional pressurized air or the like may by-pass line 46 and be conveyed through line 48 and conduit 48' to the lower manifold 49 and thence to air-vents generally indicated by jets 50.

To avoid unrequired complication of the drawing, specific means for ultimately deflating hull 28 is not shown in said simplified diagram, but the same will be elementary to skilled practitioners of the related art, in view of data herein. Likewise, it is to be assumed that operations which relate to launchings per se may be controlled by preference, from a single control panel in connection with which numeral 51 illustrates how the schematic compound valve group there shown would function; as by manually turning nob 15.

In this arrangement "F & R" means "front and rear," for turning on the respective front and rear jets. "Com. Off" means "compression off." The other symbols are self-explanatory.

The stress-wires 65, in any preferred arrangement, may be incorporated to maintain the desired shape of hull 28 when inflated, and for internal bracing.

Needless to say, the semi-cantilevers, along with said auxiliary hull 28—which latter can be inflated to any required rigidity—provide an exceedingly sturdy, seaworthy, buoyant and compact arrangement, whereby the most desirable qualities of both land-based and water-based aircraft may be combined.

In contrast with deeper-drafted flying boats, having relatively much heavier and less buoyant marine understructures, which must plow boatwise for long distances before launching, amphibian 1 quickly overcomes the coefficient of subsurface drag; consequently the break-out can occur after an exceedingly brief take-off run.

At such times it is to be observed that the boundary layer, as here indicated in somewhat exaggerated size, forming between the lower flow-line 12' and the air jet nozzles 50 (line 12' being, of course, seen transversely and not according to its downstream heading longitudinally of the aircraft) will be widely extensive and well imprisoned between the confines of twin-keels 23'.

Thus, as aircraft 1 will be moving at a substantial speed before take-off, the lower boundary air will be swept swiftly to the rear, and any tendency toward a premature lateral escapement of the same will be overcome by the configuration of said right and left keels—as generally indicated by right and left diversion arrows 52. Obviously, too, the movement of the aircraft will in itself have the effect of promoting the escapement of the airstream from the vent nozzles in a rapid downstream direction. The break-out will occur quickly, automatically.

A similar action will occur with reference to wing floats 31 and flow-lines 12", any suitable conduits 53 being employed to introduce airflow to the wing-float vents from the compression source, or sources.

Further simplification

A more simplified and sub-combinational form is depicted in Fig. 3. While this structure is not limited to hydroaeroplanes of any given size, the same commends itself especially for use on inexpensive, lighter aircraft, since from both a cost and a weight standpoint, as well as from the standpoint of space displacement, it represents something close to an irreducible minimum in float gear of the order contemplated.

That is, instead of the inflatable auxiliary hull 28 of Fig. 1, amphibian 54 may have only the fuselage floor bottom 55, through which a predetermined number of air-vents 56 are ducted to lower escapements from the transverse manifold 57; which manifold is complemented by right and left risers 58—58 ducting to atmosphere at ports 59—59. By preference, a plurality of these manifold and riser devices is provided, as exemplified—in Fig. 4—by a forward manifold 57 with risers 58, viewed in side elevation, and the rearwardly disposed manifold 60 in conjunction with risers 61. The respective ports 59 and 62, located well above the water line 29, are self-explanatory.

When aircraft 54 is in a stationary position, water will naturally come up into the risers as high as the outer water line; but such water will be drawn out automatically as soon as the craft moves over the surface.

The simple right and left webs 63, of flexible rubbery material, by preference, may be of an adequate thickness for all required tensioning in their extended positions as here shown; and when retracted, they fold back into the small compartment 64 according to the closing actions of the cantilevers 5ª, as was similarly mentioned in regard to elements 5 of Fig. 1. It may be found, in practice, that air-vents 56 can be supplemented to advantage by introducing right and left sub-manifolds 66 along webbing 63, fed from the main manifolds 57 and venting through said webbing as indicated at air jets 67. Elements 12" and 52' are comparable to elements 12' and 52 of Fig. 1, including the like feature of Fig. 2. Phantoms 5" are similar to phantoms 5'. Semi-cantilevers 5ª, may be operable in accord with suggestions given relative to cantilevers 5 of Fig. 1. The same, however, are subject to further adaptation in the manner to be later explained relative to the landing techniques.

The undersize wing floats 31', having any preferred pattern of upper air intakes 68, are conformable to the aerodynamic features of the general hull structure, such as indicated by manifolds 57—60 and risers 58—61 of Fig. 4. Having the upwardly curving frontal areas 69, they can be formed of lightweight material. The largely schematic parallel linkage of the float struts 71—72 is self-explanatory; this general form of suspension being selected in order to facilitate horizontal—instead of vertical—retraction of floats 31' into suitable pockets or wells therefor on the lower sides of the wings. See phantom 71'. Realistic details of such mechanism, which may be in plurality on each float, are not shown since old and well known in the art of comparable undergear—particularly on landing gear wheels.

It is obvious that any desired combinational use of elements shown on the respective aircrafts 1 and 54 is permissible.

Reducing to practice

In launching amphibian 54, the general result will be not greatly unlike that obtained with the structure of aircraft 1, notwithstanding the absence of the compressor group 45 and/or the pressure bottle or bottles B, for the reason that as soon as craft 54 attains even moderate forward motion, the movement of hull 55, relative to the water, will produce an automatic inhalation of atmospheric air through ports 59—62.

This air will be sucked downward in substantial volume through the risers 58—61 into manifolds 57—60 and thence, through vents 56 and 56' as well as the lower subsidiary outlets 67, to the lower water line, creating a lower boundary layer similar to that described in relation to Fig. 1. In like manner the flow-line 73, Fig. 4, represents the movement of the boundary air traveling swiftly along the fuselage bottom 55 from air vents 56 to the rear, having been augmented by a similar airflow through vents 56' adjacent step 7. Obviously the boundary layer will include the volume of air drawn out through subsidiary vents 67, and owing to the tunnel construction of the hull the lower air-stream will be largely confined between the twin keels until its escapement astern.

The faster craft 54 travels prior to actual take off, the larger will be the volume of inducted air through ports 59—62 and the more speedy and effectual the severance of the lower water line from the hull structure—thus enabling the aircraft to quickly rise to the step position and to launch without having further to overcome a suction component. As was mentioned in connection with the similar elements of Fig. 1, the water-sealed air chambers 30'—30' at right and left sides of the webbing 63 will contribute greatly to the buoyancy of amphibian 54 and thereby further facilitate the take-off.

It is relatively immaterial if webbing 63, under normal tensioning, bows upwardly under the pressure of the weight of aircraft against the contrary pressure of the water. In fact, a limited amount of such flexing is premeditated and constitutes one of the saliently desirable advantages of these undercarriages—both as to Fig. 1 and Fig. 3. The mechanism controlling the operation of cantilevers 5ª, as only briefly indicated at knuckles 40, assures a thoroughly seaworthy, well braced undercarriage at all times prior to take-off.

In Fig. 3, with especial reference to the cushioning of landing contacts, an optional means therefor is provided in the form of a particularly flexible hull bottom 157. Element 157, in short, is comprised of a yieldable casing member which can be utilized for surface contacts instead of the rigid hull bottom 55; and, if so utilized, may include the lower manifold 158 in lieu of or in addition to manifold 57 thereabove.

Thus, by ducting the conduits 66—66 into manifold 158 and by providing suitably disposed air-vents 159, the air-streams inhaled through ports 59 and risers 58 will form a lower boundary layer below element 157 to facilitate launchings—on the one hand—and in landings the element 157 will yield upwardly to the position generally indicated by contour line 160.

Obviously, element 157 is preferably formed of very flexible, elastic material, such as natural or synthetic rubber, for example; and when the semi-cantilevers 5ª are closed, the retraction of casing 157 may be facilitated by inclusion of one or more collapsible devices 161, the latter having a coiled tension spring therewithin, substantially as shown, to aid retraction in the manner of a bellows. It is also obvious that the airstream, on entering through ports 59, could be carried downwardly from manifold 57 through element or elements 161 and thence directly into lower manifold 158, if desired, instead of through conduits 66. Similar provision could be made relative to manifold 60, Fig. 4.

It is obvious that if element 157 is to be employed, including air vents 159, the similar outlets 56 may be omitted.

The auxiliary shock absorbers

According to a preferred further modification, the semi-cantilevers 5ª could be so mounted—under spring tension, for instance—that at the instant of contact with surface 29 they, too, would have limited further movement outwardly but be automatically locked against recovery movement beyond the predetermined areas shown while in their extended relations. Clearly, too, the further outward flexing of the semi-cantilevers should be restrained beyond a predetermined point to avoid over-extension; and recovery thereafter, to the approximate positions seen in Figs. 1 and 3, should be substantially instantaneous and automatic.

Means for the limited additional flexing of the semi-cantilevers 5 or 5ª, as the case may be, can be provided for by the particular structure of the toggle mechanism 41. That is, referring now to the detail of Fig. 5, the toggle device there shown is observed to include the right and left toggle-arms 162 and 162' having interlinking engagements with each other and with piston rod 42 at the knuckle assembly 163. In this version, arms 162—162' are formed with right and left cylinders 164, within which the plungers 165 on each of the piston-rods 166 and 166' are adapted for limited relative repositioning with respect to each of the cylinders 164, as additionally controlled by compression springs 167. To be more precise, only rod 166' can itself move relative to its particular cylinder for outward flexing, while the opposite cylinder moves relative to rod 166. In fact, both cylinders may have a coordinated movement relative to said rod 166.

Rod 166 is pivotally carried from the knuckle 168 while rod 166' engages knuckle 168' on the inner side of semi-cantilever 5. It is clear, therefore, that when the semi-cantilevers are in their initially extended, airborne positions, substantially as here indicated by cantilever 5, the toggle 41 will be locked in a counter-bracing relation to the respective knuckles 168 and 168'. But on contacting the water at surface location 29'—and without disturbance of the interlocking relations between elements 42, 162 and 162'—the semi-cantilevers of a dual assembly thereof will momentarily yield upwardly and outwardly to phantom positions 5', comparable to the action of oleo struts at the instant of landing impact between the wheel treads and an airfield runway.

This action is permitted by the brief movement of the left-hand plunger 165 to position 165' (including coactive movement of the right-hand cylinder) against the restraint of springs 167; and immediately thereafter, the shock of the landing impact—as additionally dampened by the yieldable hull bottom 28—having been in large measure dissipated, the semi-cantilevers will be pulled back to the normal taxiing positions relative to surface 29.

It is obvious, too, that upon the recovery of the semi-cantilevers, their reflex-action is again limited for the time being by the return of the left-hand plunger 165 to the back end of the left-hand cylinder 164, substantially as shown. Obviously too, the right-hand cylinder 164 will have become automatically re-oriented with respect to the fixed plunger on that side of the toggle.

Needless to say, the springs 167 will be of such strength as to not only return the semi-cantilevers in the manner explained but will, in themselves, be sufficient to maintain the plungers in juxtaposition with the back ends of the cylinders whenever the master cylinder 37 is operated to break the toggle interlock, whereby to retract the entire hull component.

The mechanism of Fig. 5, of course, is not limited to the specific means disclosed, as such a structure may readily be changed and sundry substitutes hereafter improvised. One of the various possible equivalents, for example, is shown in Fig. 6, wherein only element 162″ is provided with an automatic flexing and reflexing means in the form of the assembly including an over-ride link 169. Link 169 is suitably slotted therethrough to receive the compression spring 167′, the latter being coiled about the pin 170 which is supported at the right-hand end of link 169 within the axial opening 171. The opposite end of pin 170 bears the head 172, which is arcuately concaved on the side thereof opposite pin 170 whereby to engage partially around the pivot-pin 173 of bracket 174 approximately as indicated. As head 172 remains in partially slidable contact with pivot-pin 173 at all times, and is also snugged between the respective sides of the knuckle formed by the upper end or ends of bracket 174, it cannot escape from the open slotway of link 169.

Obviously, then, when the semi-cantilever 5 is pushed out to position 5′—as permitted by the movement of the over-ride link 169 from right to left to the location of phantom 169′—spring 167′ will merely be compressed momentarily, and will quickly exert sufficient thrust against the head 172 to return link 169 to its previous position, including the return of the semi-cantilever 5 relative to surface 29.

Bracket 174 is formed to include a yoke or fork, the respective sides of which are open as low as the area indicated at line 175, so as to allow the over-ride link to move downward therebetween, as indicated by arcuate line 176, at such time as the toggle interlock is to be broken and both of the members of a semi-cantilever assembly are to be retracted inwardly and upwardly to the fuselage. Other features of the Fig. 6 view will be clearly understood in accord with the explanation given relative to Fig. 5.

Fig. 7 illustrates a motor-driven equivalent of both the Figs. 5 and 6 structures. Thus instead of utilizing a toggle mechanism, the reversible motor 177 is adapted to drive the helically grooved shaft 178 having respective right and left hand threads, as generally indicated. Rotation of shaft 178 in one direction, obviously, will cause cylinders 179 and 180 to move laterally according to the action imparted thereto through internally threaded sleeves 181—182 whereby to extend the semi-cantilevers 5 to approximately the positions indicated; these being the airborne, prelanding positions. But immediately upon contact with the water, cantilevers 5 will be momentarily pushed upwardly and outwardly to positions 5′, at which time each of the respective dualities of piston-rods 183, including plungers 184, will move further laterally against the yielding restraint of compression springs 185. But elements 5 will thence be quickly returned to their initial outboard positions by the recovery action of said springs.

Semi-cantilevers 5 are retracted by merely operating motor 177 in reverse.

While the mechanism of Fig. 7 is slower-acting than the cylinder-controlled toggle arrangements of Figs. 5 and 6, this feature is relatively immaterial as there will be every required time for extending the semi-cantilevers before each landing and for retracting them after every take-off.

If, however, without benefit of a toggle, it is desired to retain the quicker-acting fluid means for both extending and retracting the semi-cantilevers, the relatively simple structure of Fig. 8, including combination thrust-and-shock-damping struts 186 and 187, may be used. It is quite apparent that, in this particular version, the cylinders 186—187 are linked directly to the semi-cantilever knuckles at pivots 189; said cylinders having slidable engagements with right and left piston rods 190 and 191, being movable outwardly, as at position 5 of the cantilevers, by the operation of valve V to direct fluid into the intakes 192—right and left—for pressure action against right and left plungers 193. And for retracting the semi-cantilevers, valve V is operated to introduce sufficient fluid through the intakes 192′, against the opposite sides of the plungers, to produce a diametrically opposite result.

Thus, also, incidental to a landing impact, the semi-cantilevers will be briefly forced to positions 5′ against the yieldable restraint of compression springs 194; the latter operating instantly thereafter to return said semi-cantilevers to the approximate lower positions shown. It is apparent that comparable results may readily be had by reversing the positions of cylinders 186—187, whereby the rods 190—191 would be linked at pivot points 189 and the respective cylinders carried directly from inner knuckles 195.

Finally, it is felt that the present disclosure makes possible the construction of aircraft of the potentially largest launchable and landable sizes, as opposed to those limited solely to terrestrial runways, along with the elimination of specific drawbacks heretofore inherent in hydroaeroplanes: a factor of increasing importance wherein future transglobal commerce may tend to flow automatically into airborne bottoms comparable, in the aeronautical sense, to existing cargo and passenger ships of the first magnitude. The utility of airborne naval units of commensurate sizes is also self-evident.

I claim:

1. In a watercraft, the combination including a main hull upper structure and a subsidiary hull understructure, the latter constituting primary flotation means for said craft; said understructure incorporating right and left longitudinal hull sections carried as semi-cantilevers to swing from respective port and starboard sides of the watercraft and mounted for both laterally inward and outward movements from pivotal means carried at respective right and left upper main hull locations, and from which pivotal means the respective hull sections are movable arcuately downwardly and inwardly to their fully retracted positions; a web of flexible material being connected, at one lengthwise portion thereof to the inner sides of the respective hull sections, and, at another lengthwise portion thereof, to said main hull upper structure; said web component, in co-action with said hull sections, forming a substantially water-sealed lower flotation means of great buoyancy along the axial length of said subsidiary understructure.

2. In an hydroaerial craft having airfoils, an upper body component, a lower hull component, and pilot-operable means for electively imparting extensible or retractive movement to said hull component, that form of construction wherein the under side of the latter named component is of tunnel configuration; said lower hull component including a flexible webbing means positioned for yieldable contact with the landing surface.

3. In an hydroaerial craft, the combination including: a main body structure and a subsidiary hull structure, said subsidiary structure incorporating hull sections hinged in contiguous relations, respectively, to the port and starboard side walls of said main body structure, and movable into respective flying and floating positions about axes which extend substantially in the direction of flight of said craft; and a web element of flexible, collapsible material connected to the inner sides of said hull sections, said web element, in coaction with said sections, forming at least one yieldable, substantially water-sealed chamber of great buoyancy along the length of said subsidiary structure, the respective right and left hinge means being positioned to engage the respective uppermost portions of said hull sections, enabling their lowermost edges to swing arcuately inwardly to their closed positions as unitary, segmental portions of the aircraft skin.

4. The augmented combination of claim 3, wherein said hydroaerial craft is provided with a plurality of apertures venting downwardly through the underside of said web element, and through which apertures—in one of the waterborne positions and relations of said subsidiary hull structure coincidental with the take-off of said craft as a fully airborne body—air jets are emitted to form a pneumatic boundary layer extending rearwardly from the proximity of said apertures across a substantial lower portion of said subsidiary hull component.

5. In an hydroaerial craft, the combination with wings, an empennage, and a main hull component which includes right and left hull sub-portions movable into respective flying and floating positions about axes which extend substantially in the direction of flight of said craft; and pilot-operable means, adapted to be remotely actuated from within the interior of said craft to electively move said sub-portions for their extension or retraction relative to said main hull component; the contouring of the craft, at underside areas of its contact with the water when said right and said left hull sub-portions are at their extended positions, being of tunnel configuration, and said hull sub-portions including at least one flexible webbing element positioned for yieldable contact with the landing surface.

6. In an aircraft to be landed on water, the combination, with airfoils and the main aircraft body, which includes a marine undercarriage; said undercarriage comprising respective port and starboard float elements separately dependent from said main body and movable into flying and floating positions about axes which extend substantially in the direction of flight of said craft; said combination further including: pilot-operable means to move said float elements to respective positions thereof preliminary to a landing impact; and auxiliary other means—including shock-absorbing instrumentalities associated directly coactively with the float-moving means, but entirely supplemental thereto and carried remote from the surface-striking portion or portions of said float elements—for normally enabling the latter to be further partially extended automatically resistingly, in immediate reaction to the impact force received thereagainst incidental to a landing impact.

7. In an aircraft to be frequently landed on water, the combination, with the main airframe casing structure, of an aquatic undercarriage therefor; said undercarriage including a primary float component having entrained means for its extension retractively from within the outer streamlined configuration of said airframe casing, and subsidiary other mechanism, incorporating at least one shock-absorber device, for limiting the initial extensible action of said float component normally preliminary to a landing contact but permitting a limited optimum amount of further extensible movement thereof to occur automatically responsively to the impact force received thereagainst incidental to such a contact.

8. Aquatic undercarriage mechanism for hydroaerial craft which includes, in combination: a fully constituted float member extensible from said craft on its port side; a like float member extensible therefrom on its starboard side; means to retractively extend the respective float members to spaced positions thereof normal thereto preliminary to a landing operation; and auxiliary means, including spring-loaded strut members entrained with the respective float members for permitting a limited optimum amount of further extensible movement thereof to occur automatically responsively to the impact force received thereagainst incidental to a landing contact.

9. Aquatic undercarriage mechanism for hydroaerial craft which includes, in combination: a landing float member extensible from said craft on its lower port side; a like float member extensible therefrom on its lower starboard side; right and left panel members—comprising integral components of said float members—swingably mounted for inward and outward movement from and relative to the main hydroaerial body structure; means, operable from within the interior of said body structure, to electively move said panels either extensively or retractably; and shock-absorber mechanism interconnected to each of said panel members.

10. The combination, with an aircraft fuselage characteristic of land based airplanes, of a marine undercarriage therefor; said undercarriage comprising respective elongate panel members mounted, adjacent their upper longitudinal edges, for swingable movements laterally outwardly and downwardly from the port and starboard sides of said fuselage to assume their burden-bearing positions, and inwardly upwardly thereto for full retractive movement; at least one collapsible webbing element being securely affixed to respective inner sides of said panel members and adapted to form, in structure therewith, at least one substantially water-sealed air-chamber; said fuselage bearing elongate recesses into one, each, of which the respective panel members are retractively received and the latter externally contoured to serve—in their closed positions—as partial bottom wall and partial side wall segments of the fuselage skin.

11. In an hydroaerial craft, the combination with wings and an empennage which further includes: a body portion; right and left elongate hull portions movable downwardly and outwardly from said body portion, and upwardly inwardly thereto, about respective axes to their respective floating and flying positions; an axial support to which each hull portion is movably connected adjacent the upper lengthwise portion thereof; pilot-operable means to electively move said hull portions for either extension or retraction; and flexible, substantially water-tight means interconnecting the respective hull portions to said first body portion.

12. In an aircraft to be landed on water, the combination with airfoils and a fuselage—characteristic of land-based airplanes—of hydrodynamic landing gear therefor; said combination including: an auxiliary hull component extensible laterally outwardly and downwardly from said fuselage in integral relation with right and left movable fuselage segments, in structure, and the latter comprising auxiliary means for extending, retracting and supporting said hull component in a plurality of variable positions; other supporting means to which each such fuselage segment is movably connected adjacent the upper lengthwise portion thereof; and said hull component, per se, comprising pneumatically formable-deformable means securely affixed to the respective lower inner sides of said fuselage segments, as well as to portions of the lower fuselage proper, and forming, in coaction with said movable segments, a shock-resisting element of great buoyancy and substantial flexibility along at least the respective lower sides of the aircraft.

13. In an aircraft to be frequently landed on water, the combination which includes: a main airframe body structure; hydrodynamic landing-and-float-gear extensible from said body structure and retractable thereto, in relation to the respective landing and flying operations of said craft; pilot-operable means to retractively extend said landing-and-float-gear to a position thereof which is normal thereto preliminary to a landing operation; and auxiliary means—including shock-absorbing instrumentalities associated directly coactively with the landing-and-float-gear extending means, but supplementary thereto and operatively remote from the surface-striking portion or portions of said first named gear—for normally enabling the latter to be further partially extended automatically resistingly, in immediate reaction to the impact force received thereagainst incidental to a landing contact.

14. In an aircraft to be frequently landed on water, the combination which includes: a main airframe body structure; hydrodynamic landing-and-float-gear thereon; pilot-operable means to retractively extend said landing-and-float-gear to an outboard position thereof which is normal thereto preliminary to a landing operation; and auxiliary means, including shock-absorbing mechanism, for enabling said first named gear to be further partially extended automatically resistingly in immediate reaction to the impact force received thereagainst incidental to a landing impact; said shock-absorbing mechanism being carried, at least primarily, inboard said main body structure remote from the surface contacting portion or portions of said landing-and-float-gear but entrained reciprocally coactively therewith.

15. In an aircraft to be frequently landed on water, the combination which comprises: an airframe; hydrodynamic float gear thereon; pilot-controllable means for electively moving said float gear into respective flying and floating positions thereof, including a position normal thereto preliminary to a landing operation; and other means, including shock-absorbing instrumentalities of a class which are normally not directly pilot-operable, for enabling said float gear to react automatically resistingly, but instantaneously yieldably, to the impact force of a landing contact.

16. In an hydroaerial craft, the combination with wings and an empennage which further includes: a body portion; right and left elongate hull portions movable downwardly and outwardly from said body portion, and upwardly inwardly thereto, about respective axes to respective floating and flying positions; an axial support to which each hull portion is movably connected adjacent the upper lengthwise portion thereof; pilot-operable means to electively move said hull portions for either extension or retraction; and flexible, substantially water-tight means interconnecting the respective hull portions to each other.

17. In an aircraft to be frequently landed on water, the combination which comprises: an airframe; hydrodynamic float gear thereon; pilot-controllable means for electively moving said float gear into respective flying and floating positions thereof, including a position normal thereto preliminary to a landing operation; and spring-loaded means, associated cooperably with said float gear-moving means for automatically cushioning the initial shock of a landing impact thereagainst.

18. In an aircraft to be frequently landed on water, the combination which comprises: an airframe; hydrodynamic float gear thereon; pilot-controllable means for electively moving said float gear into respective flying and landing positions thereof; and means—including a plurality of shock cylinders having piston members extensible therefrom against tension, and said pistons being automatically extendable resistingly in response to the application of extensible force to said float gear—for dampening the initial shock of a landing impact thereagainst.

19. In an aircraft to be frequently landed on water, the combination which comprises: an airframe; hydrodynamic float gear thereon; pilot-controllable means for electively moving said float gear into respective flying and floating positions thereof; and shock-absorber mechanism for said float gear, at least a component of said shock-absorber mechanism being integrally entrained with the float gear moving means for cooperative action therebetween.

20. In an aircraft to be frequently landed on the surface of water, the combination which comprises: an airframe; hydrodynamic float gear thereon; pilot-controllable means for electively moving said gear into respective flying and surface-contacting positions thereof; and at least one shock-absorber connected to said float gear operably remote from the surface-contacting portions thereof.

21. In an aircraft to be landed on water, the combination with wings and a main airframe body structure which includes hydrodynamic landing-and-float gear extensible from and retractable to said body structure; and pilot controlled means, operable from inboard said craft, for electively moving said gear into the normal position thereof preliminary to a landing contact; said landing-and-float gear comprising an auxiliary hull component having a bottom portion equipped with means enabling it to strike the landing surface yieldably; and cooperating other means, including shock-absorber mechanism in coactive structure with the landing-and-float gear extending means, for permitting substantial additional yieldable action of the bottom portion relative to said surface, in one relation, and, in another, for causing its partial recovery—immediately following such a landing impact—to a normal burden-bearing position thereof with respect to the remainder of the aircraft.

OWEN BROWN.

(References on following page)

References Cited in the file of this patent

UNITED STATES PATENTS

| Number | Name | Date |
|---|---|---|
| 640,946 | Quanonne | Jan. 9, 1900 |
| 780,122 | Nelson | Jan. 17, 1905 |
| 1,170,965 | Curtiss | Feb. 8, 1916 |
| 1,416,950 | Fay | May 23, 1922 |
| 1,489,619 | Tsavaris | Apr. 8, 1924 |
| 1,725,452 | Harper | Aug. 20, 1929 |
| 1,802,996 | Wurth | Apr. 28, 1931 |
| 1,824,313 | Vogler | Sept. 22, 1931 |
| 1,866,451 | Carden | July 5, 1932 |
| 1,894,256 | De Ganahl | Jan. 10, 1933 |
| 2,320,574 | Dornier | June 1, 1943 |
| 2,349,584 | Arnstein | May 23, 1944 |
| 2,361,293 | Jeffries | Oct. 24, 1944 |
| 2,399,196 | Bolster | Apr. 30, 1946 |
| 2,418,702 | DuPont | Apr. 8, 1947 |
| 2,429,992 | Crispell | Nov. 4, 1947 |
| 2,463,351 | Bowers | Mar. 1, 1949 |

FOREIGN PATENTS

| Number | Country | Date |
|---|---|---|
| 264,635 | Italy | May 4, 1929 |
| 267,071 | Germany | Nov. 6, 1913 |
| 268,746 | Italy | Oct. 28, 1929 |
| 49,151 | France | Aug. 22, 1938 |